US007433344B2

United States Patent
Lee et al.

(10) Patent No.: US 7,433,344 B2
(45) Date of Patent: *Oct. 7, 2008

(54) MOBILE COMMUNICATION SYSTEM AND METHOD FOR PROVIDING REAL TIME MESSENGER SERVICE AMONG MOBILE COMMUNICATION TERMINALS

(75) Inventors: Chul-Hwan Lee, Yongin-si (KR);
Shin-Hee Do, Anyang-si (KR);
Woo-Hyuk Choi, Suwon-si (KR);
Dong-Ryul Lee, Suwon-si (KR);
Hye-Kyoung Hwang, Seoul (KR);
Sung-Min Kang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 649 days.

This patent is subject to a terminal disclaimer.

(21) Appl. No.: 10/960,405

(22) Filed: Oct. 7, 2004

(65) Prior Publication Data

US 2005/0197143 A1    Sep. 8, 2005

(30) Foreign Application Priority Data

Mar. 4, 2004   (KR) ................ 10-2004-0014583

(51) Int. Cl.
*H04Q 7/24* (2006.01)
(52) U.S. Cl. ..................................... 370/338; 455/466
(58) Field of Classification Search ................ 370/310, 370/328, 338, 349; 455/412.1, 456, 466
See application file for complete search history.

(56) References Cited

U.S. PATENT DOCUMENTS

| | | | | |
|---|---|---|---|---|
| 6,950,660 | B1 * | 9/2005 | Hsu et al. ................ | 455/456.1 |
| 7,149,195 | B2 * | 12/2006 | Kall et al. ................ | 370/328 |
| 7,277,416 | B1 * | 10/2007 | Chang et al. ............. | 370/338 |
| 2002/0035605 | A1 | 3/2002 | McDowell et al. | |
| 2002/0086672 | A1 * | 7/2002 | McDowell et al. ......... | 455/432 |
| 2003/0013467 | A1 * | 1/2003 | Caloud ..................... | 455/466 |
| 2003/0142654 | A1 * | 7/2003 | Chambers et al. .......... | 370/338 |
| 2005/0073981 | A1 * | 4/2005 | Banerjee et al. ........... | 370/338 |
| 2005/0135294 | A1 * | 6/2005 | Do .......................... | 370/328 |

FOREIGN PATENT DOCUMENTS

| | | |
|---|---|---|
| EP | 1 361 756 | 12/2003 |
| WO | WO 02/077840 | 10/2002 |

OTHER PUBLICATIONS

Day et al., "Instant Messaging/Presence Protocol Requirements", Feb. 1, 2000.
Campbell et al., "Request for Comments 3428: Session Initiation Protocol (SIP) Extension for Instant Messaging", Dec. 1, 2002.

* cited by examiner

*Primary Examiner*—Ricky Ngo
*Assistant Examiner*—Kan Yuen
(74) *Attorney, Agent, or Firm*—The Farrell Law Firm, PC

(57) ABSTRACT

In a mobile communication system, a host mobile communication terminal transmits an invite message to a client mobile communication terminal by means of a short message, and the host mobile communication terminal and the client mobile communication terminal perform a mutual messenger service through a PDSN, such that a system for the messenger service may be easily constructed and a message may be quickly transmitted. Further, a host mobile communication terminal and client mobile communication terminals each perform a point-to-point protocol connection with a PDSN, and perform a mutual messenger service, such that they can exchange data having various formats, such as text messages, audio information, and data/image information stored in the terminal with each other.

10 Claims, 5 Drawing Sheets

MOBILE COMMUNICATION SYSTEM AND METHOD FOR PROVIDING REAL TIME MESSENGER SERVICE AMONG MOBILE COMMUNICATION TERMINALS

PRIORITY

This application claims priority to an application "Mobile Communication System for Providing Real Time Messenger Service Among Mobile Communication Terminals and Messenger Service-Providing Method Using the Same" filed in the Korean Intellectual Property Office on Mar. 4, 2004 and assigned Serial No. 2004-14583, the contents of which are hereby incorporated by reference.

BACKGROUND OF THE INVENTION

1. Field of the Invention

The present invention relates generally to a mobile communication system, and more particularly to a mobile communication system, which supports text chatting, file transmission, and voice signal transmission among terminals through a real time information transmission service in a wireless network, without installing a separate system, and a messenger service-providing method using the mobile communication system.

2. Description of the Related Art

Currently, services provided by a code division multiple access (CDMA) mobile communication system have developed to include multicasting multimedia communication services through which both voice and a large amounts of data, such as packet data or circuit data, are transmitted. As a result, recently developed mobile communication terminals include performance capabilities and programs rivaling with those of personal computers. The improvement in portability and performance of the mobile communication terminal itself facilitates the use of supplementary functions by a user. Further, mobile communication terminals are store a large amount of data such as telephone numbers and personal schedules, which can be output or edited accordingly.

Additionally, mobile communication terminals have become personal effects of many modern persons, and users can exchange contact numbers with each other by exchanging one's own number of the mobile communication terminal with each other. This phenomenon has occurred because data storable in mobile communication terminals includes not only various telephone numbers but also the addresses and Internet mail addresses of users, even personal avatars.

Recently, a real time information transmission service program called "messenger" is being installed in a mobile communication terminal, thereby enabling an exchange of data between mobile communication terminals. Herein, the "messenger" service is a kind of real time information transmission service. The "messenger" service provides users with a full-duplex state in which users on both sides can simultaneously transmit a message to each other, similarly to telephone communication. This is an improvement over of the older half-duplex state in which a user cannot transmit a message while the other user on the counterpart side transmits another message, similarly to radio communication. In addition to the existing simple chatting, such a messenger service includes a multi-function, through which files, voice, and information such as a music or news may be transmitted.

FIG. 1 is a block diagram illustrating a conventional mobile communication system for providing a real time messenger service among mobile communication terminals. As illustrated in FIG. 1, mobile communication terminals 12, 14, 16, and 18 perform mutual mobile wireless communication among themselves through base stations 22, 24, and 26, and base station controllers 32 and 34. Herein, the base stations 22, 24, and 26 provide a mobile wireless network service to corresponding mobile communication terminals 12, 14, 16, or 18, and the base station controllers 32 and 34 control corresponding base stations 22, 24, or 26. Further, the mobile communication terminals 12, 14, 16, and 18 can exchange short messages with each other by means of a short message providing-service provided by a short message service (SMS) provider 52.

The existing mobile communication system for a real time information transmission service must include a separate messenger system in addition to the aforementioned communication network. Herein, the messenger system includes a messenger service subscriber data base (DB) 42 and a messenger server 44. The messenger service subscriber data base 42 stores operation state information for mobile communication terminals of subscribers receiving the messenger service, and list information about registered communication partners. The messenger server 44 manages the messenger service subscriber data base 42 and provides the real time messenger service to the mobile communication terminals 12, 14, 16, and 18.

Such a mobile communication system for the real time information transmission service uses a short message as a means for transmitting messages and control information among the mobile communication terminals 12, 14, 16, and 18. However, because the short message service provider 52 providing the short message service does not provide a short message service for interactive transmission among the mobile communication terminals 12, 14, 16, and 18, the message transmission causes a heavy load, which prevents the system from operating in real time. Further, the existing mobile communication system for the real time information transmission service has a disadvantage in that the system is limited to only the short message transmission among the mobile communication terminals 12, 14, 16, and 18.

Further, the messenger server 44 manages an operation state of each of the mobile communication terminals 12, 14, 16, and 18 when providing the messenger service to the mobile communication terminals 12, 14, 16, and 18, thereby causing an additional load. That is, the messenger server 44 calls the mobile communication terminals 12, 14, 16, and 18 in order to understand the operation state of each terminal. As a result, the wireless network is overloaded.

SUMMARY OF THE INVENTION

Accordingly, the present invention has been designed to solve the above and other problems occurring in the prior art, and an object of the present invention is to provide a mobile communication system supporting a messenger service performed among mobile communication terminals without installing a separate messenger system for the messenger service, and a messenger service-providing method using the system.

Another object of the present invention is to provide a mobile communication system supporting a messenger service that is performed in real time among mobile communication terminals, and a messenger service-providing method using the system.

Another object of the present invention is to provide a mobile communication system supporting a messenger service that is performed in real time among mobile communication terminals using an existing mobile communication wireless network, and a messenger service-providing method using the system.

In order to accomplish the above and other objects, according to an aspect of the present, there is provided a mobile communication system for a messenger service among mobile communication terminals. The mobile communication system includes a packet data serving node for assigning an IP address to each of the mobile communication terminals, and providing a message exchange service among the mobile communication terminals through a point-to-point protocol connection with the mobile communication terminals. A short message server provides a short message transmission service among the mobile communication terminals, and a host mobile communication terminal receives the IP address through the point-to-point protocol connection with the packet data serving node, transmits an invite message, which includes the IP address, in a short message format to the short message server, updates a buddy list, a list of communication partners, on the basis of a register message received through the packet data serving node, and transmits the updated buddy list to the packet data serving node. At least one client mobile communication terminal receives the IP address through the point-to-point protocol connection with the packet data serving node when the invite message is received from the short message server, transmits the register message including the IP address to the host mobile communication terminal through the packet data serving node, and receives the updated buddy list transmitted from the host mobile communication terminal.

According to another aspect of the present, there is provided a method for providing a messenger service among mobile communication terminals by means of a mobile communication system including a host mobile communication terminal, at least one client mobile communication terminal, a short message server providing a short message service among the mobile communication terminals, and a packet data serving node assigning an IP address to each of the mobile communication terminals through a point-to-point protocol connection with the mobile communication terminals. The method includes the host mobile communication terminal transmitting an invite message including an IP address to the client mobile communication terminal through via the short message server when the host mobile communication terminal receives the IP address for the messenger service from the packet data serving node. The client mobile communication terminal receives the invite message, receives the IP address from the packet data serving node, and transmits a register message to the host mobile communication terminal via the packet data serving node. The host mobile communication terminal updates a buddy list, a list of communication partners, on the basis of the register message, and transmits the updated buddy list to the client mobile communication terminal via the packet data serving node. The host mobile communication terminal and the client mobile communication terminal perform the mutual messenger service on the basis of the updated buddy list.

According to the present invention, a host mobile communication terminal transmits an invite message to a client mobile communication terminal by means of a short message, and the host mobile communication terminal and the client mobile communication terminal perform a mutual messenger service through a PDSN, such that a system for the messenger service may be easily constructed and a message may be quickly transmitted. Further, a host mobile communication terminal and client mobile communication terminals each perform a point-to-point protocol connection with a PDSN, and perform a mutual messenger service, such that they can exchange data having various formats, such as text messages, audio information, and data/image information stored in the terminal with each other.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
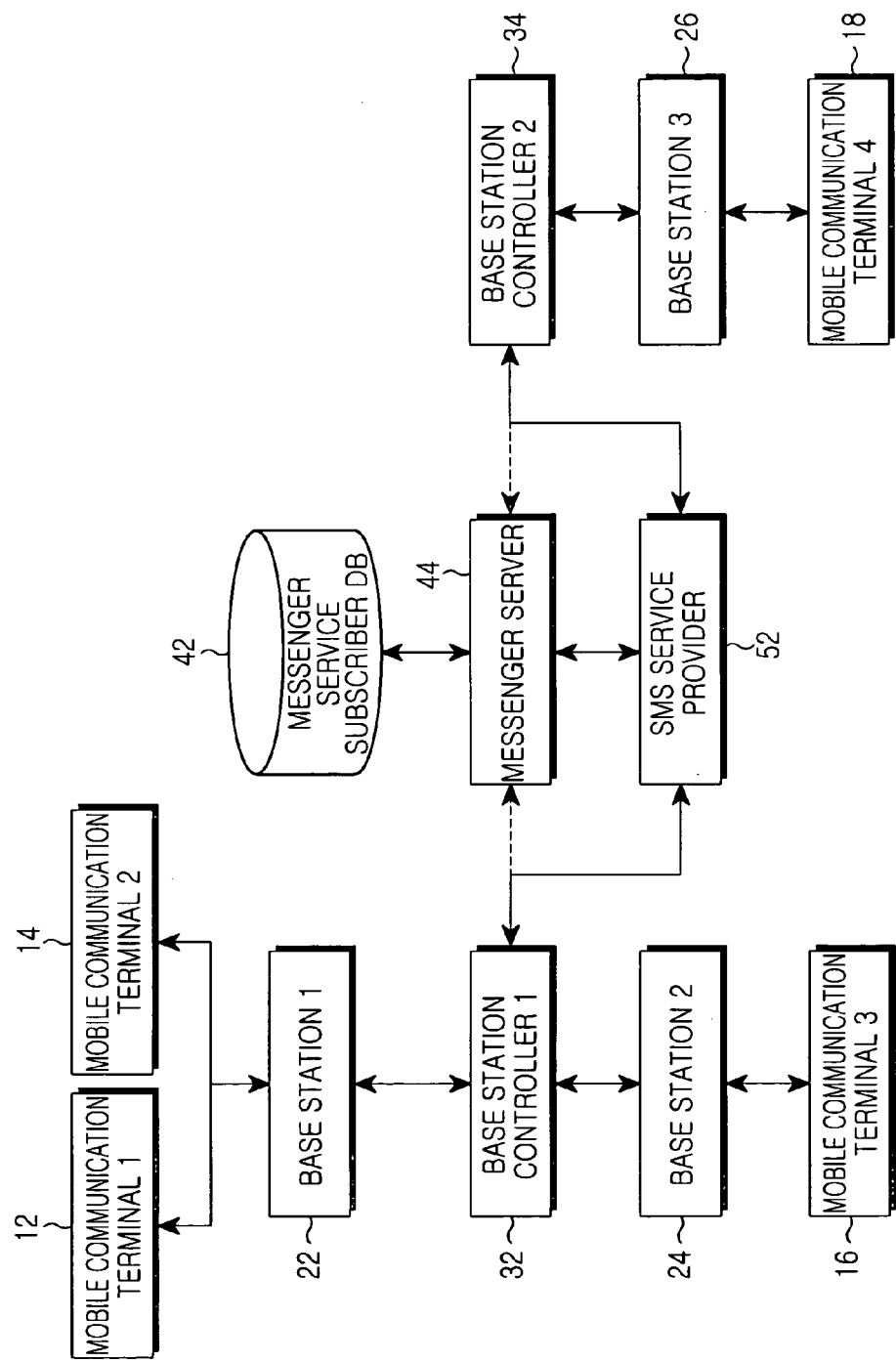
FIG. 1 is a block diagram illustrating a conventional mobile communication system for providing a real time messenger service among mobile communication terminals.

Preferred embodiments of the present invention will be described in detail herein below with reference to the accompanying drawings. The same reference numerals are used to designate the same elements as those shown in other drawings.

In the description below, many particular items, such as detailed elements of circuit, are shown, but these are provided for helping the general understanding of the present invention. It will be understood by those skilled in the art that the present invention can be embodied without particular items. Additionally, a detailed description of known functions and configuration incorporated herein will be omitted when it may obscure the subject matter of the present invention.

Figure 2:
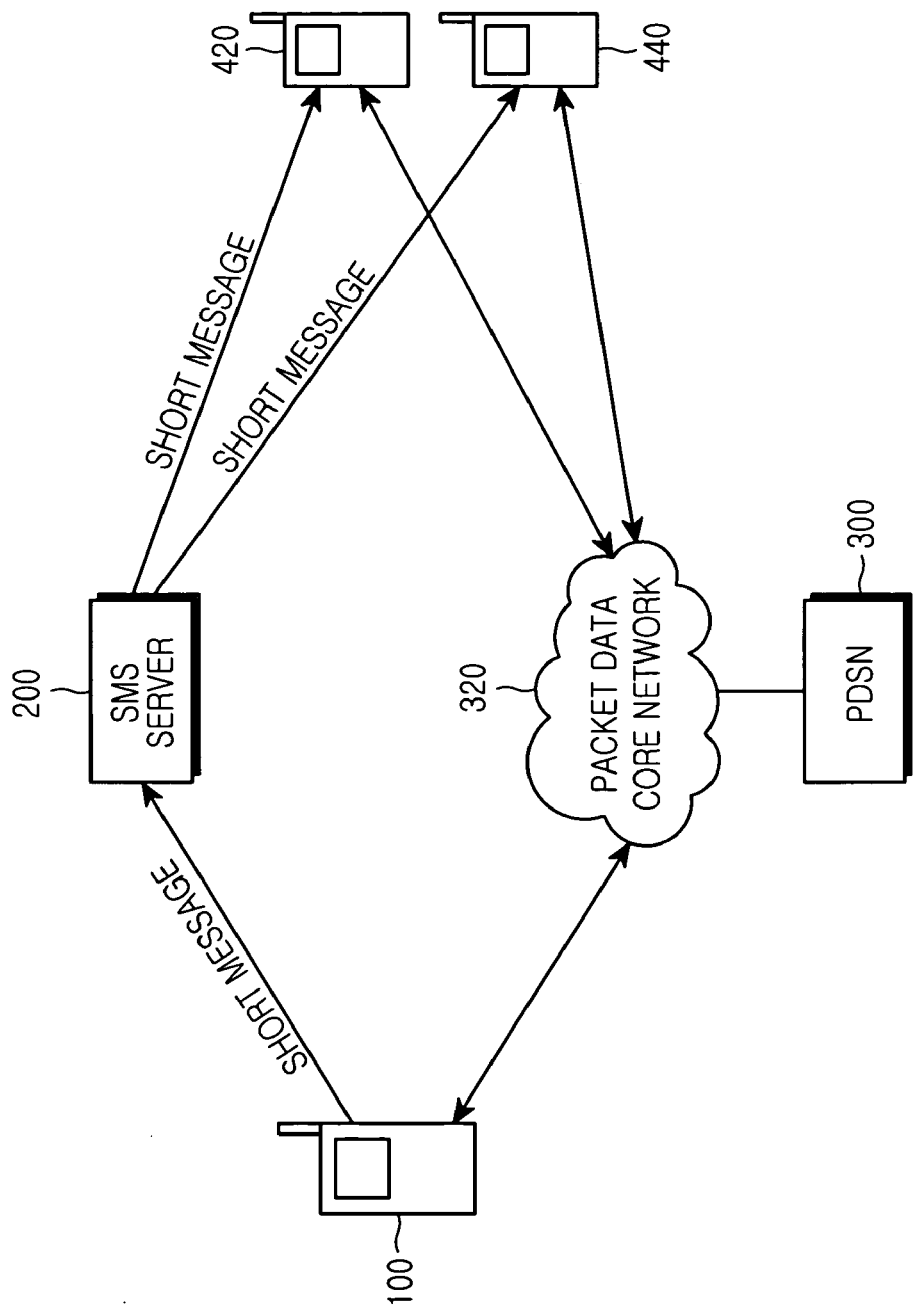
FIG. 2 is a block diagram of a mobile communication system supporting a real time messenger service that is performed among mobile communication terminals according to a preferred embodiment of the present invention.

FIG. 2 is a block diagram of a mobile communication system supporting a real time messenger service that is performed among mobile communication terminals according to a preferred embodiment of the present invention. As illustrated in FIG. 2, a host mobile communication terminal 100 and client mobile communication terminals 420 and 440 each set point-to-point protocol (PPP) communication channels with a packet data serving node (PDSN) 300 through a packet data core network 320, and then perform mutual packet data communication. The host mobile communication terminal 100 and the client mobile communication terminals 420 and 440 each include messenger programs for providing a messenger service enabling text and/or voice communication as well as data exchange to be performed among the terminals.

When a messenger driving signal is input in the host mobile communication terminal 100, the host mobile communication terminal 100 drives the stored messenger program. Further, when a signal, which requires communication with users of the client mobile communication terminals 420 and 440 through the messenger service, is input, the host mobile communication terminal 100 generates a buddy list, that is, a list of communication partners registered through a messenger program of a selected client mobile communication terminal 420 or 440.

The host mobile communication terminal 100 performs a point-to-point protocol connection with the PDSN 300 through the packet data core network 320 in order to obtain an Internet protocol (IP) address. When the point-to-point protocol connection with the PDSN 300 is successfully performed, the host mobile communication terminal 100 receives the IP address from the PDSN 300.

After the IP address is received from the PDSN 300, the host mobile communication terminal 100 transmits an invite message, which includes the received IP address, in a short message format to each of the client mobile communication terminals 420 and 440 through an SMS server 200.

Thereafter, the host mobile communication terminal 100 determines whether or not register messages that have been transmitted from the client mobile communication terminals 420 and 440 through the packet data core network 320 as responses to the transmitted invite messages, are received within a predetermined time period. When the register messages are received, the host mobile communication terminal 100 updates the buddy list using of the register messages, and transmits the updated buddy list to each of the client mobile communication terminals 420 and 440.

Accordingly, when the invite message is received from the host mobile communication terminal 100 through the SMS server 200, each of the client mobile communication terminals 420 and 440 drives its own messenger program.

Further, the client mobile communication terminals 420 and 440 detect basic information of the host mobile communication terminal 100, which includes the IP address of the host mobile communication terminal 100, from the invite messages having the short message formats. The client mobile communication terminals 420 and 440 perform the point-to-point protocol connection with the PDSN 300 through the packet data core network 320. When the point-to-point protocol connection with the PDSN 300 is successfully performed, the client mobile communication terminals 420 and 440 receive IP addresses assigned from the PDSN 300. Additionally, the client mobile communication terminals 420 and 440 generate the register messages, including the assigned IP addresses and transmit the register messages to the host mobile communication terminal 100 via the packet data core network 320.

When the updated buddy list is received from the host mobile communication terminal 100, after the register messages have been transmitted, the client mobile communication terminals 420 and 440 update buddy lists, which have been stored in the client mobile communication terminals 420 and 440, using the received buddy list. Preferably, the buddy list includes address information registered for performing the messenger service through the host mobile communication terminal 100 and the client mobile communication terminals 420 and 440.

Accordingly, the host mobile communication terminal 100 and the client mobile communication terminals 420 and 440 each have the updated buddy lists, and may perform a messenger service with mobile communication terminals registered to addresses corresponding to such a buddy list.

From among the host mobile communication terminal 100 and the client mobile communication terminals 420 and 440, a mobile communication terminal receiving a signal for requiring the termination the messenger service, i.e., receiving an end command from a user, transmits messenger service ending messages to the other mobile communication terminals, which have joined in the messenger service, through the packet data core network 320. Then, the mobile communication terminals receiving the messenger service ending messages update the buddy lists and delete information of the mobile communication terminal having transmitted the messenger service ending messages.

Accordingly, the host mobile communication terminal 100 and the client mobile communication terminals 420 and 440 having joined in the messenger service may check in real time states of the mobile communication terminals having joined in the messenger service.

As described above, the host mobile communication terminal 100 and the client mobile communication terminals 420 and 440 perform the point-to-point protocol connection with the PDSN 300 through the packet data core network 320, i.e., the existing wireless mobile communication network, and communicate with each other by means of the messenger service, such that it is unnecessary to install a separate system for the messenger service.

Further, the mutual messenger service among the host mobile communication terminal 100 and the client mobile communication terminals 420 and 440 is performed through the packet data core network 320. Therefore, a quick message transmission can be achieved and the burden of cost with respect to transmission data can be reduced, in comparison with a messenger service using a short message.

In addition, files and text messages may be transmitted through the mutual messenger service between the host mobile communication terminal 100 and the client mobile communication terminals 420 and 440. As a result, it is possible to transmit data, such as address books, bell sounds, photograph images, dynamic images, etc., which is stored in the mobile communication terminals.

Figure 3:
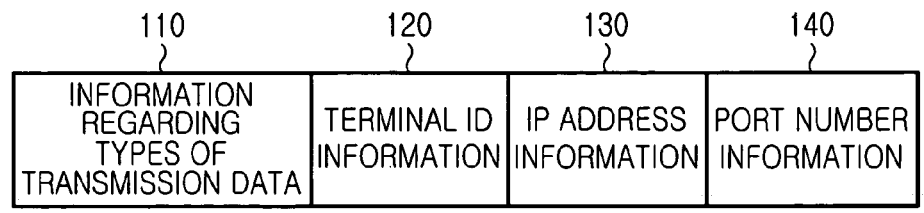
FIG. 3 illustrates a format of the invite message, which is transmitted from a host mobile communication terminal to client mobile communication terminals.

FIG. 3 illustrates a format of the invite message, which is transmitted from the host mobile communication terminal 100 to the client mobile communication terminals 420 and 440. As illustrated in FIG. 3, the invite message includes information regarding types of transmission data 110, terminal ID information 120, e.g., information of the host mobile communication terminal 100, and IP address information 130, and port number information 140 assigned to the host mobile communication terminal 100. The information regarding types of transmission data 110 is information regarding types of transmitted data, and the type of transmission data in the present invention is a short message representing the invite message. The terminal ID information 120 of the host mobile communication terminal 100 represents information related to identification assigned to the host mobile communication terminal 100. Such identification information may include telephone number information, for example. The IP address information 130 is IP address information assigned to the host mobile communication terminal 100, and the port number information 140 is port number information assigned to the host mobile communication terminal 100.

Figure 4:
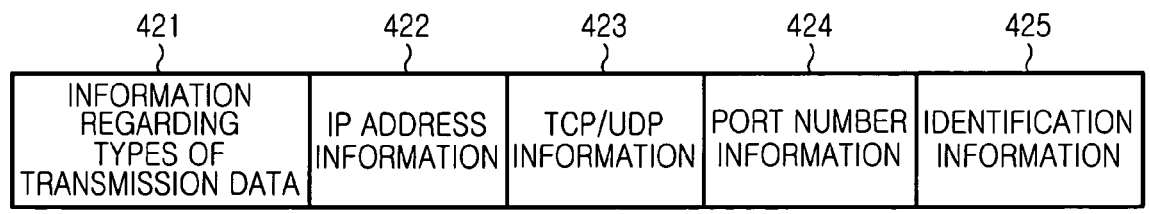
FIG. 4 illustrates a format of the register message, which is requested from a host mobile communication terminal by client mobile communication terminals.

FIG. 4 illustrates a format of the register message, which is requested from the host mobile communication terminal 100 by the client mobile communication terminals 420 and 440. As illustrated in FIG. 4, the register message includes information regarding types of transmission data 421, IP address information 422, transmission control protocol (TCP)/user datagram protocol (UDP) information 423, port number information 424, and identification information 425. The information regarding types of transmission data 421 is information regarding types of transmitted data, and the type of transmission data in the present invention is a message representing the register message. The IP address information 422 includes IP address information of the host mobile communication terminal 100 and the client mobile communication terminals 420 and 440. The TCP/UDP information 423 includes TCP/UDP information of the host mobile communication terminal 100 and the client mobile communication terminals 420 and 440. Herein, the TCP information is session information used to transmit a data file among the mobile communication terminals 100, 420, and 440. The UDP information is information used to transmit messenger communication contents among the mobile communication terminals 100, 420, and 440, through the messenger service. The port number information 424 is port number information assigned to each of the client mobile communication terminals 420 and 440, and the identification information 425 includes subscriber information, for example, telephone number information, required for identifying the client mobile communication terminals 420 and 440.

Figure 5:
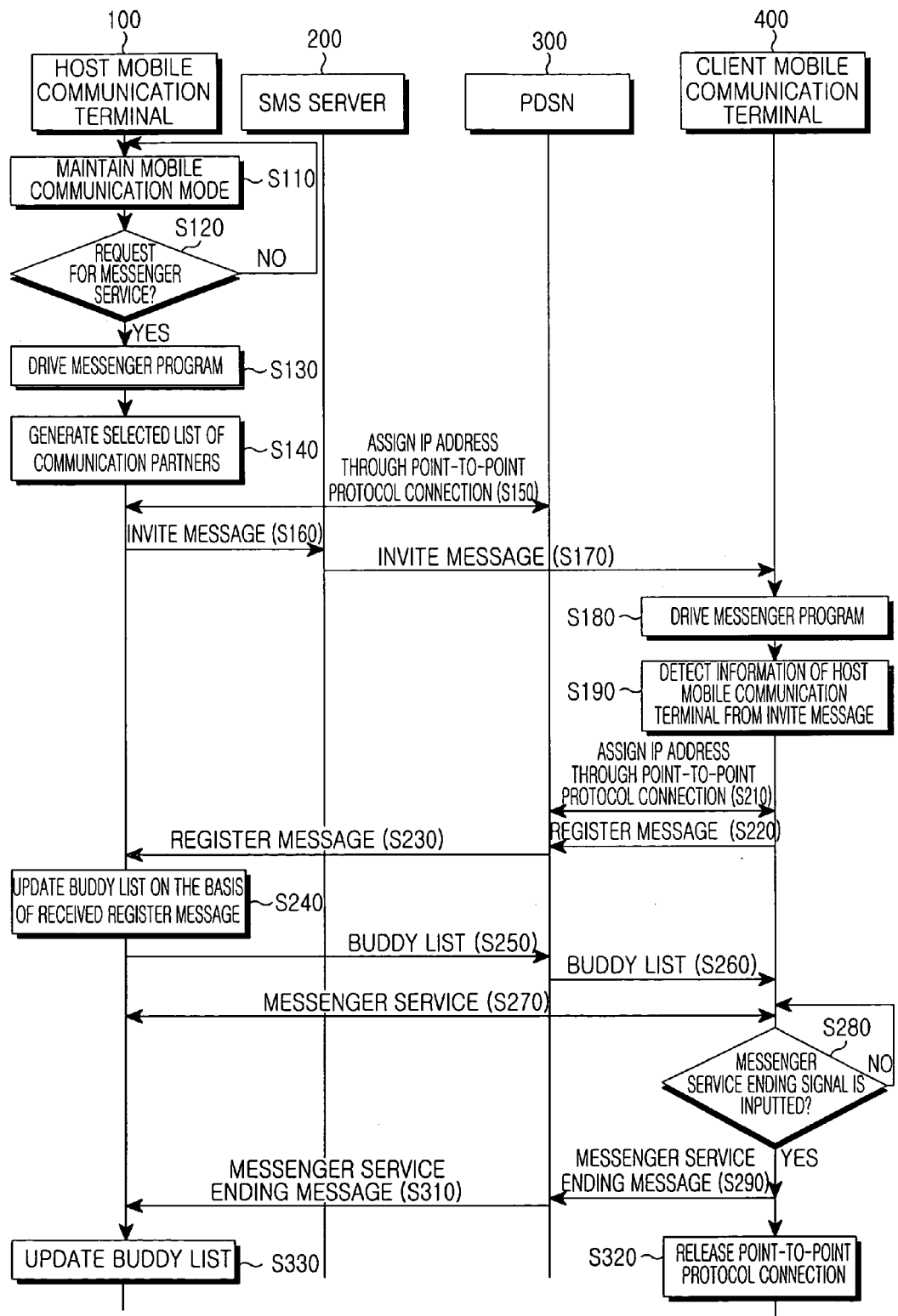
FIG. 5 is a flowchart illustrating a messenger service-providing method, which uses a mobile communication system for a messenger service, according to a preferred embodiment of the present invention.

FIG. 5 is a flowchart illustrating a messenger service-providing method, which uses a mobile communication system for a messenger service, according to a preferred embodiment of the present invention. In step S110, the host mobile communication terminal 100 normally maintains a mode for mobile communication. While maintaining a mobile communication mode, the host mobile communication terminal 100 determines whether or not a command for the messenger service is input in step S120.

When the command for the messenger service is input, the host mobile communication terminal 100 drives a messenger program for the messenger service in step S130. When a signal, which has been selected for communication by a user from among users list corresponding to stored client mobile communication terminals, is input, the host mobile communication terminal 100 generates a buddy list corresponding to a selected list of communication partners in step S140.

When the buddy list has been completely generated, the host mobile communication terminal 100 performs a point-to-point protocol connection with the PDSN 300, and receives an IP address from the PDSN 300 in step S150.

When the IP address is assigned to the host mobile communication terminal 100, the host mobile communication terminal 100 transmits an invite message, which has a short message format, to the SMS server 200 in step S160. The invite message includes the assigned IP address information, terminal ID information, and port number information of the host mobile communication terminal 100. The SMS server 200 transmits the invite message sent from the host mobile communication terminal 100 to the client mobile communication terminal 400 in step S170.

When the invite message is received, the client mobile communication terminal 400 determines that the type of received message is a message for the messenger service, and drives a messenger program in step S180. The client mobile communication terminal 400 detects information of the host mobile communication terminal 100 from the invite message in step S190. Herein, the information of the host mobile communication terminal 100 includes the IP address information, the ID information, and the port number information of the host mobile communication terminal 100.

The client mobile communication terminal 400 receives an IP address through the point-to-point protocol connection with the PDSN 300 in step S210. When the IP address is received from the PDSN 300, the client mobile communication terminal 400 transmits a register message including the IP address to the PDSN 300 in step S220. Herein, the register message includes TCP information, port number information, and identification information in addition to the IP address information.

The PDSN 300 transmits the register message received from the client mobile communication terminal 400 to the host mobile communication terminal 100 in step S230.

The host mobile communication terminal 100 updates a buddy list, which has been selected for communication invitation, using the received register message in step S240. After updating the buddy list, the host mobile communication terminal 100 transmits the updated buddy list to the PDSN 300 in step S250. The PDSN 300 transmits the buddy list received from the host mobile communication terminal 100 to the client mobile communication terminal 400 in step S260.

When the host mobile communication terminal 100 and the client mobile communication terminal 400 share the same buddy list, which is communication partner information, the host mobile communication terminal 100 and the client mobile communication terminal 400 perform the mutual messenger service in step S270.

During the messenger service, the client mobile communication terminal 400 determines whether or not a messenger service ending signal is input in the client mobile communication terminal 400 in step S280. When the messenger service ending signal is not input, the client mobile communication terminal 400 continuously performs the messenger service with the host mobile communication terminal 100. However, when the messenger service ending signal is input, the client mobile communication terminal 400 transmits a messenger service ending message to the PDSN 300 in step S290. When the messenger service ending message is received from the client mobile communication terminal 400, the PDSN 300 transmits the received messenger service ending message to the host mobile communication terminal 100 in step S310.

After transmitting the messenger service ending message, the client mobile communication terminal 400 releases the point-to-point protocol connection with the PDSN 300 in step S320. Further, when the messenger service ending message is received from the PDSN 300, the host mobile communication terminal 100 updates the buddy list registered in a communication state in step S330. That is, the host mobile communication terminal 100 deletes a communication list of the client mobile communication terminal 400, which has transmitted the messenger service ending message, from the buddy list.

Figure 6:
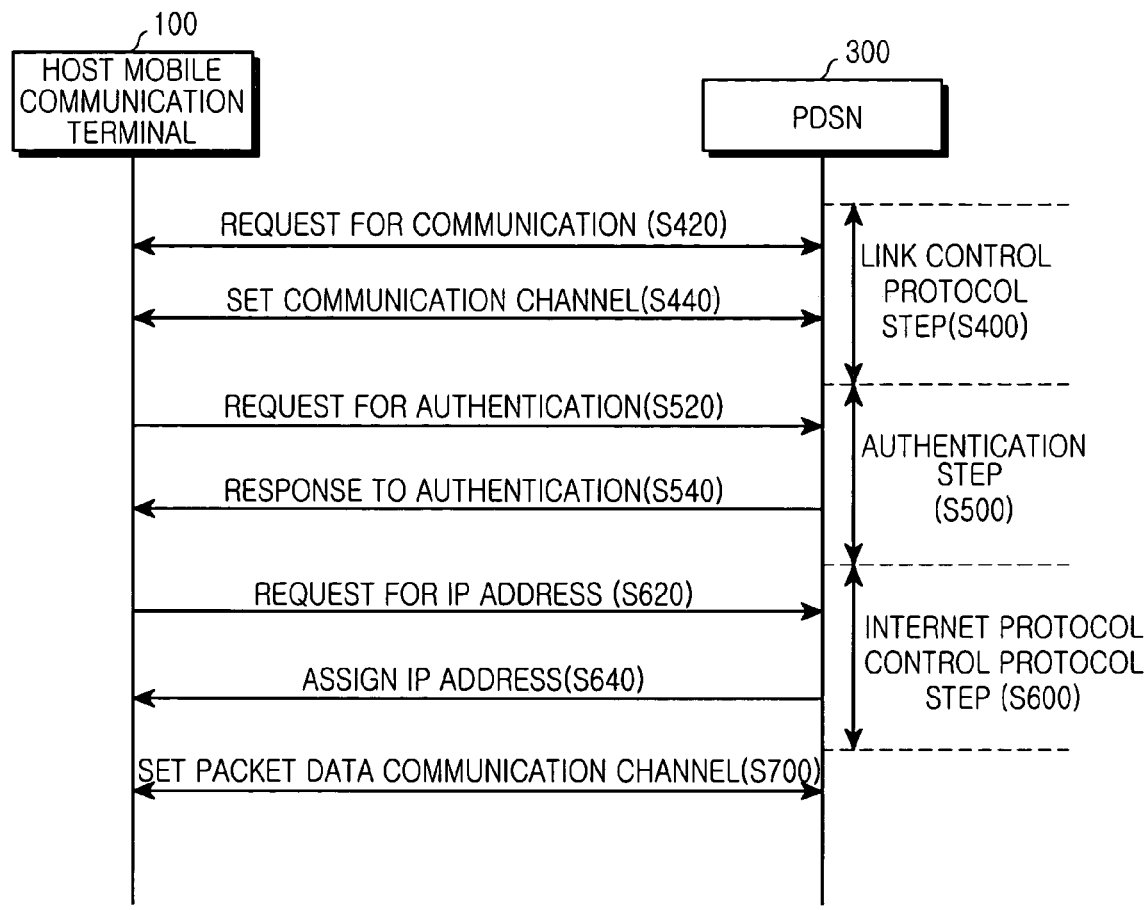
FIG. 6 is a detailed flowchart illustrating the process illustrated in FIG. 5, in which a host mobile communication terminal and a client mobile communication terminal establish a point-to-point protocol communication channel with a PDSN for packet data communication.

FIG. 6 is a detailed flowchart illustrating the process illustrated in FIG. 5 in which the host mobile communication terminal 100 and the client mobile communication terminal 400 each set the point-to-point protocol communication channels with the PDSN 300 for packet data communication. Because the process in which the host mobile communication terminal 100 sets the point-to-point protocol communication channel is to the same as the process in which the client mobile communication terminal 400 sets the point-to-point protocol communication channel, only the process in which the point-to-point protocol communication channel is set between the host mobile communication terminal 100 and the PDSN 300 will be described herein below with reference to FIG. 6.

Referring to FIG. 6, a method for setting the point-to-point protocol communication channel between the host mobile communication terminal 100 and the PDSN 300 includes a link control protocol (LCP) step S400, an authentication step S500, and an Internet protocol control protocol (IPCP) step S600. During the LCP step S400, the host mobile communication terminal 100 and the PDSN 300 make a communication request through negotiation in step S420. Herein, the host mobile communication terminal 100 and the PDSN 300 set a communication channel, which enables communication between the host mobile communication terminal 100 and the PDSN 300, through the communication request in step S440.

After the communication channel is set between the host mobile communication terminal 100 and the PDSN 300, in the authentication step S500, the host mobile communication terminal 100 makes a request for authentication to the PDSN 300 in step S520. The PDSN 300 responds to the authentication request of the host mobile communication terminal 100, authenticates the host mobile communication terminal 100, and transmits a response signal with respect to the authentication request to the host mobile communication terminal 100 in step S540.

After the communication channel with the PDSN 300 has been set and the authentication by the PDSN 300 has been completed, in the IPCP step S600, the host mobile communication terminal 100 makes a request for an IP address for packet data communication to the PDSN 300 in step S620. Herein, when there is an IP address to be assigned to the host mobile communication terminal 100, the PDSN 300 assigns the IP address to the host mobile communication terminal 100, and transmits information for the assigned IP address to the host mobile communication terminal 100 in step S640. Accordingly, the host mobile communication terminal 100 sets the point-to-point protocol communication channel for the packet data communication with the PDSN 300 in step S700.

According to the present invention, a host mobile communication terminal transmits an invite message to a client mobile communication terminal by means of a short message, and the host mobile communication terminal and the client mobile communication terminal perform a mutual messenger service through a PDSN, such that a system for the messenger service may be easily constructed and a message may be quickly transmitted. Additionally, the host mobile communication terminal and client mobile communication terminals each perform a point-to-point protocol connection with a PDSN, and perform a mutual messenger service, such that they can exchange data having various formats, such as text messages, audio information, and data/image information stored in the terminal with each other.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A mobile communication system supporting a messenger service among a plurality of mobile communication terminals, the mobile communication system comprising:
   a packet data serving node for assigning an Internet Protocol (IP) address to each of the mobile communication terminals, and providing a message exchange service among the mobile communication terminals through a point-to-point protocol connection with the mobile communication terminals;
   a short message server for providing a short message transmission service among the mobile communication terminals;
   a host mobile communication terminal from among the mobile communication terminals for receiving the IP address through the point-to-point protocol connection with the packet data serving node, transmitting an invite message, which includes the IP address, in a short message format to the short message server, updating a buddy list using a register message received through the packet data serving node, and transmitting the updated buddy list to the packet data serving node; and
   at least one client mobile communication terminal from among the mobile communication terminals for receiving the IP address through the point-to-point protocol connection with the packet data serving node when the invite message is received from the short message server, transmitting the register message, including the IP address, to the host mobile communication terminal through the packet data serving node, and receiving the updated buddy list transmitted from the host mobile communication terminal,
   wherein the host mobile communication terminal and the client mobile communication terminal perform a mutual messenger service through the packet data serving node.

2. The mobile communication system as claimed in claim 1, wherein, when a messenger service termination signal is input to the at least one client mobile communication terminal, the at least one client mobile communication terminal transmits a messenger service ending message to mobile communication terminals participating in the messenger service, through the packet data serving node, and releases the point-to-point protocol connection with the packet data serving node.

3. The mobile communication system as claimed in claim 2, wherein, when the messenger service ending message is received from the at least one client mobile communication terminal, the host mobile communication terminal performs a buddy list updating operation to delete communication information of the at least one client mobile communication terminal from the buddy list.

4. The mobile communication system as claimed in claim 1, wherein the invite message includes information regarding types of transmission data, identification (ID) information of the host mobile communication terminal, IP address information, and port address information assigned to the host mobile communication terminal.

5. The mobile communication system as claimed in claim 1, wherein the register message includes information regarding types of transmission data, IP address information assigned to the client mobile communication terminal, transmission control protocol (TCP)/user datagram protocol (UDP) information, port number information, and authentication information.

6. A method for providing a messenger service among a plurality of mobile communication terminals by a mobile communication system including a host mobile communication terminal among the plurality of mobile communication terminals, at least one client mobile communication terminal among the plurality of mobile communication terminals, a short message server providing a short message service among the mobile communication terminals, and a packet data serving node for assigning an Internet Protocol (IP) address to each of the mobile communication terminals through a point-to-point protocol connection with the mobile communication terminals, the method comprising the steps of:
   requesting an IP address for the messenger service from the packet data serving node by the host mobile communication terminal;
   receiving, by the host mobile communication terminal, the IP address for the messenger service from the packet data serving node;
   transmitting, from the host mobile communication terminal to the at least one client mobile communication terminal, an invite message including the IP address via the short message server;

receiving, by the at least one client mobile communication terminal, the invite message;

receiving, by the at least one client mobile communication terminal, the IP address from the packet data serving node;

transmitting a register message from the at least one client mobile communication terminal to the host mobile communication terminal via the packet data serving node;

receiving, by the host mobile communication terminal, the register message from the at least one client mobile communication terminal;

updating a buddy list, by the host mobile communication terminal, using the register message;

transmitting the updated buddy list from the host mobile communication terminal to the at least one client mobile communication terminal via the packet data serving node; and performing the mutual messenger service between the host mobile communication terminal and the at least one client mobile communication terminal using the updated buddy list.

7. The method as claimed in claim 6, further comprising:

receiving a messenger service termination signal in the at least one client mobile communication terminal during the messenger service transmitting a messenger service ending message from the at least one client mobile communication terminal to mobile communication terminals participating in the messenger service, through the packet data serving node; and releasing the point-to-point protocol connection with the packet data serving node by the at least one client mobile communication terminal.

8. The method as claimed in claim 7, further comprising a step of updating the buddy list by deleting communication information of the at least one client mobile communication terminal from the buddy list when the host mobile communication terminal receives the messenger service ending message from the at least one client mobile communication terminal.

9. The method as claimed in claim 6, wherein the invite message includes information regarding types of transmission data, identification (ID) information of the host mobile communication terminal, IP address information, and port address information assigned to the host mobile communication terminal.

10. The method as claimed in claim 6, wherein the register message includes information regarding types of transmission data, IP address information assigned to the client mobile communication terminal, transmission control protocol (TCP)/user datagram protocol (UDP) information, port number information, and authentication information.

* * * * *